United States Patent Office 3,453,367
Patented July 1, 1969

3,453,367
METHODS FOR TREATING INFLAMMATION WITH ESTROGENIC COMPOUNDS
Marvin C. Bachman and Phil H. Hidy, Terre Haute, Ind., assignors to Commercial Solvents Corporation, New York, N.Y., a corporation of Maryland
No Drawing. Filed June 29, 1966, Ser. No. 561,351
Int. Cl. A61k 27/00
U.S. Cl. 424—278                    9 Claims

ABSTRACT OF THE DISCLOSURE

A method is provided for treating inflammation in the living animal body in need of anti-inflammatory treatment which comprises administering to said animal body an effective dose of a compound having the structure:

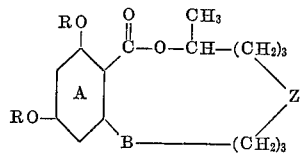

wherein B is selected from the group consisting of —CH$_2$—CH$_2$— and —CH=CH—; Z is selected from the group consisting of >C=O, >CH$_2$, and >CHOR; R is selected from the group consisting of hydrogen, lower alkyl and lower saturated acyclic acyl and

is selected from the group consisting of a benzene ring and a cyclohexane ring, with the proviso that when

is a cyclohexane ring, B is —CH$_2$—CH$_2$—, and Z is selected from the group consisting of >CH$_2$ and >CHOR.

---

This invention relates to a method of producing anti-inflammatory activity in living animal bodies.

The most widely used anti-inflammatory agents are the adrenocorticoids such as cortisone, hydrocortisone, prednisone and prednisolone. Although these adrenocorticoids possess highly effective anti-inflammatory activity, they are not without criticism. Corticosteroids are very potent drugs with profound physiological effects, which are frequently multiple. It is not uncommon, therefore, that with overdosage or with prolonged or intensive treatment to find that these drugs manifest side effects among which may be enumerated adrenal atrophy, peptic ulcer, sodium and fluid retention, osteoporosis, masking of diseases and Cushinggoid changes such as facial rounding. The desirability of finding other effective anti-inflammatory agents which are not adrenocorticoids, therefore, is readily appreciated.

It has now been found that non-adrenocortical compounds corresponding to the following structure have anti-inflammatory activity:

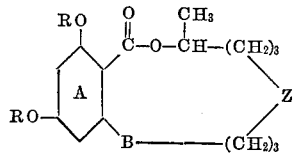

wherein B is —CH$_2$—CH$_2$— or —CH=CH—; Z is >C=O, >CH$_2$, or >CHOR; R is hydrogen, substituted or unsubstituted alkyl, e.g., lower alkyl such as methyl, ethyl, hexyl, etc., and acyl, e.g., lower saturated acyclic acyl such as acetyl and valeryl and

is a benzene ring, i.e.,

or a cyclohexane ring with the proviso that when

is a cyclohexane ring, B is —CH$_2$—CH$_2$— and Z is >CH$_2$ or CHOR. If desired, the 3- and 5-position of the ring

may include non-interfering substituents, that is, substituents which do not deleteriously effect the anti-inflammatory activity of the compounds or otherwise render the compounds unsuitable for use.

The compounds of the present invention include the compound:

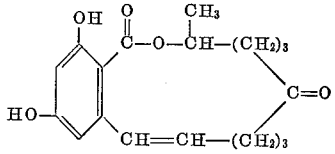

hereinafter referred to as the fermentation estrogenic substance (F.E.S.) from which the other compounds of the invention can be produced by reduction of the ketone group to replace the oxygen of the ketone group with two hydrogen atoms, by reducing the ketonic group to add two hydrogens thereto, by saturation of the olefinic bond and benzene ring or any combination of such reductions. The reduction of the ketone group to replace the oxygen can be effected by several procedures. One of these procedures involves the Clemmensen reduction using zinc and hydrochloric acid; another involves the Wolff-Kishner reduction using hydrazine and alkali, e.g. NaOH, and the third involves formation of the dithioacetal with ethylene dithiol or ethylmercaptan and the catalytic desulfurization with Raney nickel catalyst containing adsorbed hydrogen.

The addition of two hydrogen atoms to the ketonic group and saturation of the olefinic bond and benzene ring can be obtained by conventional reduction procedures, for instance, in the presence of Raney nickel catalyst. The reduction is preferably carried out with the F.E.S. suspended or dissolved in a suitable solvent, e.g., an alcohol, preferably a lower alkanol such as methanol, ethanol, etc. In general, the reduction can be accomplished at ambient temperatures and ambient pressures. Preferable temperatures are from about 15° to 40° C., and preferably pressures are of from about 1 to 100 atmospheres. In general, from about 0.1 to 5 grams of catalyst are used per gram of F.E.S.

In producing compounds where B is —CH₂—CH₂—, the olefinic bond of F.E.S. can also be reduced, for example, by hydrogenation in the presence of a Group VIII metal, particularly platinum or palladium catalyst on a suitable carrier, e.g., charcoal. Generally, the catalyst contains from about 0.01 to about 10% of the catalytic metal. The catalyst is used in a ratio of generally from about 0.02 to 2 grams of catalyst, preferably about 0.1 to 0.5 gram, and particularly about 0.2 gram catalyst per gram of F.E.S. The reduction may be carried out while the F.E.S. is dissolved in a suitable solvent, e.g., an alcohol, especially a lower alkanol such as 2-propanol, methanol, ethanol, and acid, e.g., acetic acid, etc. at ambient temperatures; e.g., from about 15° to 40° C., and ambient pressures, since only the presence of hydrogen is required; however, it is preferred to utilize an elevated pressure, e.g., from about 1 to 50 atmospheres of hydrogen.

Compounds of the invention wherein the ring A is saturated, that is, cyclohexyl, is preferably obtained by a reduction of tetrahydro F.E.S. compounds, discussed below, which are F.E.S. compounds previously subjected to reduction to saturate the olefinic bond and add two hydrogens to the ketone group. Compounds of the invention having the saturated ring

will have as well, a saturated olefin bond and two hydrogens added to the ketone group, since it is difficult selectively to reduce the

ring of the compound F.E.S. without also reducing the olefin bond and ketone group.

Saturated

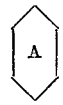

ring-containing compounds useful in the present invention have the structure:

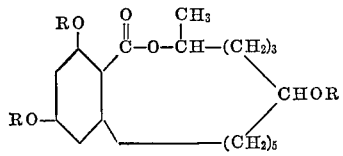

wherein R is as described above. Preparation of these compounds is described in more detail in application Ser. No. 561,350, now abandoned, of Richard L. Abbott entitled "Products" filed concurrently herewith and hereby incorporated by reference (184–458A).

In producing compounds of the present invention where R is alkyl, conventional alkylation procedures can be used to replace the H atom of one or both of the OH groups on the benzene ring of F.E.S. with an alkyl group. Alkylated dihydro F.E.S. compounds can be produced, for example, by first alkylating F.E.S. and then reducing it as set forth supra, or by first reducing it and then alkylating it. The alkylation can be by reaction with the corresponding dialkyl sulfates, e.g. dimethyl sulfate, diethyl sulfate, etc., to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

In producing compounds of the present invention where R is acyl, conventional acylation procedures can be used to replace the hydrogen atom of one or both of the hydroxyl radicals on the benzene ring of F.E.S. with an acyl radical. Acylated F.E.S. compounds can be produced, for example, by reaction with the corresponding acid anhydride, e.g. acetic anhydride, propionic anhydride, etc., catalyzed with, for example, sodium acetate or pyridine. Ambient conditions can be used although it is preferred to keep the reaction mixture cold. When compounds having one R as alkyl and the other acyl, it is advantageous to alkylate before acylating.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL-2830.

F.E.S. and its derivatives contemplated for use in the invention are disclosed in more detail with examples for their preparation in U.S. Patents Nos. 3,196,019, 3,239,345, 3,239,352, 3,239,341, 3,239,348, 3,239,342, 3,239,347, 3,239,356, all of which are hereby incorporated by reference.

In accordance with the present invention, inflammation in a living animal body, including man, is treated by administering to said body an effective dosage of the aforementioned compounds. The active ingredient is administered in a suitable dosage unit form usually carried by non-toxic, pharmaceutically-acceptable carriers, which can be inert diluents or solid carriers. Administration to the subject can be either orally, parenterally or topically. Forms suitable for oral administration include, for example, pressed or coated tablets, capsules or pills, syrups, solutions or suspensions in water or non-toxic organic solvent media such as propylene glycol and glycerol formal and dispersible powders. Compositions suitable for parenteral administration are the known pharmaceutical forms for such administration as, for example, sterile aqueous solutions or suspensions in oily media. The sterile aqueous solutions can be formulated in the presence of parenterally-acceptable buffers, e.g., sodium citrate, citric acid and/or preservatives such as phenol and methyl and propyl esters of p-hydroxy benzoic acid. A preferred oily media for preparation of the sterile aqueous solution is peanut oil. Illustrative of suitable topical forms are ointments, lotions, creams or sprays, including aerosol sprays, containing the active ingredient dissolved or suspended therein.

The pharmaceutical compositions administered may also include adjuvants known in the art as desirable or useful as, for example, wetting agents, dispersing agents, suspending agents, lubricating agents, sweetening agents, coloring agents and flavoring agents.

The effective dosage of active ingredient may vary depending upon the particular compound used, the individual subject administered to and the severity of the inflammation. Ordinarily, the dosage will fall in the range of about 0.01 to 500 milligrams, preferably 1 to 50 milligrams. If desired, other ingredients, such as hydrocortisone, prednisolone, phenylbutazone, dexamethasone, etc., may be mixed with the active compounds of the invention.

The following are examples of typical preparations containing the anti-inflammatory compounds of the present invention.

EXAMPLE I 246 grams of F.E.S. having the structure:

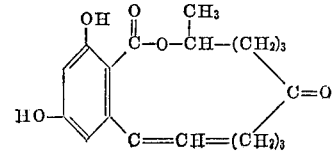

prepared as described, for instance, in U.S. Patent No. 3,239,345, is triturated with 60 grams of lactose to form an homogeneous powder. To the powder is added 20 grams of silicic acid with hydrolyzed starch and water and the mixture stirred until a homogeneous paste is formed. The paste is then dried and tableted with 2 grams magnesium stearate to form tablets containing approximately 150 mg. of active ingredient.

EXAMPLE II

Pharmaceutical preparation of aqueous suspension for oral administration:

Recipe for 1000 ml. of suspension

| | | |
|---|---|---|
| F.E.S. | g | 30.0 |
| Sucrose | g | 400.0 |
| Powdered tragacanth | g | 7.5 |
| Flavoring essential oil | ml | 0.2 |
| Methyl-p-hydroxybenzoate | ml | 2.0 |
| Propyl-p-hydroxybenzoate | ml | 0.5 |
| Glycerol | ml | 150.0 |
| Citric acid | ml | 2.0 |
| Benzoic acid | ml | 1.0 |
| Distilled water (to complete 1000 ml.). | | |

The glycerol, benzoic acid, methyl and propyl benzoic acids, tragacanth gum, flavoring oil and active ingredient are mixed into a homogeneous mass. An aqueous solution of the critic acid is then added with slurrying and finally the sucrose is added. Slurrying is continued until an homogeneous suspension is obtained to which is added the balance of the water.

EXAMPLE III 100 mg. of F.E.S., 0.2 mg. of methyl-p-methoxybenzoate, 0.5 mg. of sodium citrate and 0.2 mg. of citric acid are added to 1 ml. of water. The pH of the suspension is adjusted to 5 with HCl. Heat sterilization results in an aqueous suspension suitable for parenteral injection.

EXAMPLE IV

The following composition forms a cream suitable for topical application.

| | mg./g. |
|---|---|
| F.E.S. | 5.0 |
| Zinc bacitracin | 5.0 |
| Polyethylene glycol 6000 | 122.0 |
| Polyethylene glycol 1500 | 421.0 |
| Polyethylene glycol U.S.P. | 345.0 |
| Distilled water | 30.0 |

EXAMPLE V

The following formulation represents a suitable nasal spray.

| | mg./ml. |
|---|---|
| F.E.S. | 5.0 |
| Phenylepherine hydrochloride | 2.5 |
| Bacitracin | 5.0 |
| Benzalkonium chloride, U.S.P. | 0.25 |

Also glycerol monostearate emulsifier, sodium chloride, propylene glycol and distilled $H_2O$, to make 1 ml.

EXAMPLES VI–XII

Suitable pharmaceutical preparations can also be prepared by replacing the F.E.S. compound in the formulations of Examples I–V with any one of the following compounds or with the F.E.S. sulphonate described in application Ser. No. 561,373, now abandoned, filed of even date herewith (184–452A).

| Example | Compound | Structure | Described in U.S. Patent No. |
|---|---|---|---|
| VI | Tetrahydro F.E.S. high-melting | (structure) | 3,239,345 |
| VII | Low-melting tetrahydro F.E.S. | (structure) | 3,239,345 |
| VIII | Deoxytetrahydro F.E.S. | (structure) | 3,239,341 |
| IX | 2,4-dimethyl F.E.S. | (structure) | 3,239,354 |
| X | 4-methyl F.E.S. | (structure) | 3,239,354 |

| Compound | Structure | Described in U.S. Patent No. |
|---|---|---|
| XI ....... Dihydro F.E.S ....... | HO, HO— (structure with C(=O)—CH(CH₃)—(CH₂)₃, C=O, (CH₂)₅) | 3,239,354 |
| XII ....... Saturated F.E.S ....... | HO, HO— (structure with C(=O)—CH(CH₃)—(CH₂)₃, CHOH, (CH₂)₅) | (¹) |

¹ Application Ser. No. 561,350 filed concurrently herewith.

EXAMPLE XIII

F.E.S. or high melting tetrahydro F.E.S. and an inflammatory agent were simultaneously administered by topical application to intact female rats according to the method of Tonilli, Thibault and Ringler, Endocrinology 77:625. Briefly, this method comprises topical co-application of the test substance and a 1% croton oil vehicle to one ear of an intact rat while the other ear is used as a control. The 1% croton oil vehicle elicits a phlogistic response characterized by edema, hyperemia and over-all increase in ear size. In each test six rats were used and after six hours each rat is lightly etherized and both ears removed and individually weighed. The anti-inflammatory effect of the test substance is determined by expressing the increase in weight of the treated ear as a percentage of the weight of the contralateral control ear (i.e., $$\frac{\text{weight of inflamed ear} - \text{weight of control ear}}{\text{weight of control ear}} \times 100)$$

In all of the following tables, "COPE" means croton oil per ear.

After 48 hours the rats are sacrificed and the thymi removed and weighed. The weight of the thymus after this time period is taken as an index of the systemic effects of the test substance.

The results of the tests are shown in the following table along with test results on cortisol and butazolidin included for purposes of comparison.

TABLE I

| Treatment | Body Weight | | Tissue Weights | | Mg. Wt., Increase | Percent Increase (Inflammation) | Thymus Weight, mg. (av.) |
|---|---|---|---|---|---|---|---|
| | Initial, gm. (av.) | Final, gm. (av.) | Non-inflamed, mg. (av.) | Inflamed, mg. (av.) | | | |
| Controls, 1% COPE | 55 | 59 | 56.2 | 135.4 | 79.2 | 141.4 | 186 |
| Cortisol, 500 µg./ml | 55 | 58 | 54.0 | 97.0 | 43.0 | 79.8 | 175 |
| Cortisol, 2,000 µg./ml | 55 | 58 | 55.1 | 84.6 | 29.4 | 53.5 | 194 |
| Butazolidin, 10 mg./ml | 56 | 61 | 55.3 | 99.3 | 44.0 | 79.7 | 206 |
| Butazolidin, 40 mg./ml.¹ | 53 | 56 | 54.6 | 67.8 | 13.2 | 24.4 | 180 |
| F.E.S., 10 mg./ml | 57 | 62 | 54.3 | 90.7 | 36.4 | 65.5 | 178 |
| F.E.S., 40 mg./ml | 54 | 60 | 56.0 | 70.6 | 14.6 | 26.2 | 168 |
| F.E.S., 160 mg./ml.¹ | 54 | 49 | 55.8 | 63.6 | 7.8 | 14.2 | 175 |
| HMTH F.E.S.,² 10 mg./ml | 55 | 59 | 58.4 | 82.4 | 24.0 | 61.2 | 168 |
| HMTH F.E.S.,² 40 mg./ml | 52 | 57 | 53.0 | 61.0 | 7.6 | 15.1 | 172 |
| HMTH F.E.S.,² 160 mg./ml.¹ | 51 | 54 | 55.7 | 64.6 | 8.9 | 16.0 | 156 |

¹ Some of compound deposited on ear; deposit was not brushed off, and contributed to final weight of treated ears.
² HMTH F.E.S.=High melting tetrahydro F.E.S.

EXAMPLE XIV

In these tests the same procedure of Example XIII was used except that adrenalectomized rats were used. The results are summarized in Table II.

TABLE II

| Treatment | Body Weight | | Tissue Weights | | Mg. Wt., Increase | Percent Increase (Inflammation) | Thymus Weight, mg. (av.) |
|---|---|---|---|---|---|---|---|
| | Initial, gm. (av.) | Final, gm. (av.) | Non-inflamed, mg. (av.) | Inflamed, mg. (av.) | | | |
| Controls, 1% COPE | 57 | 57 | 60.2 | 145.3 | 85.1 | 141.4 | 246 |
| Cortisol, 500 µg./ml | 58 | 62 | 59.7 | 111.2 | 51.6 | 87.3 | 263 |
| Cortisol, 2,000 µg./ml | 58 | 56 | 57.7 | 85.8 | 28.3 | 49.2 | 223 |
| Butazolidin, 10 mg./ml | 58 | 57 | 61.1 | 130.6 | 69.5 | 113.1 | 258 |
| Butazolidin, 40 mg./ml | 58 | 57 | 61.1 | 86.1 | 25.0 | 40.5 | 232 |
| F.E.S., 10 mg./ml | 58 | 60 | 59.2 | 119.1 | 59.9 | 101.5 | 230 |
| F.E.S., 40 mg./ml | 57 | 58 | 62.9 | 90.3 | 27.4 | 42.9 | 263 |
| F.E.S., 160 mg./ml | 58 | 56 | 61.9 | 73.8 | 11.9 | 19.8 | 231 |
| HMTH F.E.S., 10 mg./ml.* | 58 | 58 | 60.2 | 101.0 | 40.8 | 67.8 | 244 |
| HMTH F.E.S., 40 mg./ml.* | 57 | 57 | 60.0 | 71.4 | 11.6 | 19.5 | 228 |
| HMTH F.E.S., 160 mg./ml.* | 58 | 56 | 60.1 | 65.1 | 5.1 | 8.3 | 221 |

* See footnote ² Table I.

EXAMPLE XV

Low-melting tetrahydro F.E.S. and deoxytetrahydro F.E.S. were evaluated according to the test procedure of Example XIII. The results are reported in Table III.

TABLE III

| Treatment | Body Weight | | Tissue Weights | | Mg. Wt., Increase | Percent Increase (Inflammation) | Thymus Weight, mg. (av.) |
|---|---|---|---|---|---|---|---|
| | Initial, gm. (av.) | Final, gm. (av.) | Non-inflamed, mg. (av.) | Inflamed, mg. (av.) | | | |
| Controls, 1% COPE | 56 | 59 | 54.1 | 139.9 | 85.8 | 158.7 | 174 |
| Cortisol, 500 µg./ml | 54 | 57 | 52.7 | 99.6 | 47.0 | 89.4 | 145 |
| Cortisol, 2,000 µg./ml | 56 | 58 | 50.4 | 96.5 | 46.1 | 91.7 | 146 |
| Butazolidin, 20 mg./ml | 55 | 61 | 53.3 | 116.7 | 63.4 | 119.0 | 177 |
| Butazoldin, 80 mg./ml | 58 | 64 | 54.9 | 70.4 | 15.6 | 28.2 | 184 |
| LMTH F.E.S.,[1] 10 mg./ml | 55 | 60 | 55.0 | 91.7 | 36.7 | 66.6 | 188 |
| LMTH F.E.S.,[1] 40 mg./ml | 57 | 62 | 56.6 | 69.3 | 12.7 | 22.5 | 181 |
| LMTH F.E.S.,[1] 160 mg./ml | 53 | 58 | 53.8 | 63.4 [2]61.1 | 9.6 [2]7.3 | 18.0 [2]13.6 | 180 |
| Deoxyetraydro, 10 mg./ml | 55 | 61 | 56.8 | 119.9 | 63.1 | 110.6 | 187 |
| Deoxyetraydro F.E.S., 40 mg./ml | 56 | 62 | 57.6 | 79.6 | 22.0 | 38.4 | 198 |
| Deoxyetraydro F.E.S., 160 mg./ml | 53 | 60 | 56.0 | 68.8 [2]66.5 | 12.8 [2]10.5 | 23.0 [2]18.8 | 188 |

[1] Low melting tetrahydro F.E.S.
[2] Values corrected for average amount of compounds recovered by brushing treated ears.

EXAMPLE XVI

Tests were conducted as in Example XIII to determine separately the effects of 2,4-dimethyl F.E.S. and 4-methyl F.E.S. For comparison, tests using aspirin and dexamethasone were also included. The results of the tests are shown in Table IV.

TABLE IV

| Treatment | Body Weight | | Tissue Weights | | Mg. Wt., Increase | Percent Increase (Inflammation) | Thymus Weight, mg. (av.) |
|---|---|---|---|---|---|---|---|
| | Initial, gm. (av.) | Final, gm. (av.) | Non-inflamed, mg. (av.) | Inflamed, mg. (av.) | | | |
| Controls, 1% COPE | 54 | 60 | 56.0 | 142.8 | 86.8 | 155.1 | 207 |
| Dexamethasone, 100 µg./ml | 54 | 55 | 52.3 | 82.8 | 30.5 | 58.4 | 77 |
| Dexamethasone, 400 µg./ml | 53 | 60 | 51.0 | 74.4 | 23.3 | 45.7 | 50 |
| Aspirin, 10 mg./ml | 53 | 60 | 55.8 | 141.5 | 85.7 | 154.4 | 184 |
| Aspirin, 40 mg./ml | 54 | 60 | 53.8 | 74.2 | 20.4 | 38.6 | 187 |
| 2,4-dimethyl F.E.S., 10 mg./ml | 54 | 61 | 55.4 | 118.2 | 62.8 | 112.9 | 176 |
| 2,4-dimethyl F.E.S., 40 mg./ml | 53 | 62 | 55.2 | 68.8 | 13.6 | 24.8 | 174 |
| 2,4-dimethyl F.E.S., 80 mg./ml [1] | 53 | 62 | 55.1 | 83.1 | 28.0 | 50.5 | 152 |
| 4-methyl F.E.S., 10 mg./ml | 55 | 64 | 55.9 | 112.9 | 57.0 | 102.2 | 180 |
| 4-methyl F.E.S., 40 mg./ml | 55 | 63 | 57.9 | 76.7 | 18.8 | 32.6 | 197 |
| 4-methyl F.E.S., 160 mg./ml [2] | 53 | 60 | 52.2 | 84.0 | 31.8 | 60.8 | 171 |

[1] Used 80 mg. instead of 160 mg. because of difficulty in making a solution. See also footnote 2 re solution.
[2] Difficult to obtain solution; crystallized on chilling. Necessity to re-warm this may have altered the effect of C.O. and/or compound.

EXAMPLE XVII

In these tests dihydro F.E.S. was evaluated using the procedure of Example XIII. Separate tests on dexamethasone, aspirin and diethylstilbestrol are included for comparison. The results are summarized in Table V.

Examination of the data of Tables I–V show that F.E.S. and the F.E.S. derivatives tested, although not being as active as the tested adrenocorticoids, nevertheless possess effective anti-inflammatory activity.

TABLE V

| Treatment | Body Weight | | Tissue Weights | | Mg. Wt., Increase | Percent Increase (Inflammation) | Thymus Weight, mg. (av.) |
|---|---|---|---|---|---|---|---|
| | Initial, gm. (av.) | Final, gm. (av.) | Non-inflamed, mg. (av.) | Inflamed, mg. (av.) | | | |
| Controls, 1% COPE | 54 | 58 | 55.3 | 143.3 | 88.0 | 159.9 | 179 |
| Dexamethasone, 50 µg./ml | 54 | 60 | 55.4 | 94.6 | 39.2 | 71.3 | 146 |
| Dexamethasone, 200 µg./ml | 54 | 54 | 53.9 | 90.6 | 36.7 | 67.8 | 64 |
| Aspirin, 20 mg./ml | 55 | 46 | 55.7 | 122.0 | 66.3 | 119.0 | 120 |
| Aspirin, 80 mg./ml | 55 | 60 | 54.2 | 68.9 | 14.7 | 16.6 | 165 |
| Dihydro F.E.S., 10 mg./ml | 55 | 61 | 56.4 | 115.8 | 59.4 | 105.3 | 176 |
| Dihydro F.E.S., 40 mg./ml | 55 | 61 | 55.9 | 71.8 | 15.9 | 29.2 | 196 |
| Dihydro F.E.S., 160 mg./ml | 55 | 62 | 56.7 | 65.6 | 8.9 | 15.6 | 169 |
| DES,[1] 10 mg./ml | 56 | 57 | 57.2 | 79.8 | 22.6 | 39.7 | 168 |
| DES,[1] 40 mg./ml | 56 | 58 | 55.6 | 64.6 | 9.1 | 16.4 | 144 |
| DES,[1] 160 mg./ml | 56 | 57 | 56.6 | 64.2 | 7.7 | 13.5 | 162 |

[1] DES=Diethylstilbestrol.

It is claimed:

1. A method of treating inflammation in a living animal body in need of anti-inflammatory treatment which comprises administering to said animal body an effective dose of a compound having the structure:

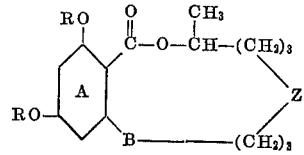

wherein B is selected from the group consisting of —$CH_2$—$CH_2$— and —CH=CH—; Z is selected from the group consisting of >C=O, >$CH_2$ and >CHOR; R is selected from the group consisting of hydrogen, lower alkyl and lower saturated acyclic acyl and

is selected from the group consisting of a benzene ring and a cyclohexane ring, with the proviso that when

is a cyclohexane ring, B is —CH₂—CH₂—, and Z is selected from the group consisting of >CH₂ and >CHOR.

2. The method of claim 1 wherein the living animal body is in need of topical anti-inflammatory treatment and is treated for topical inflammation by topically administering to said animal body an effective dose of a compound having the structure:

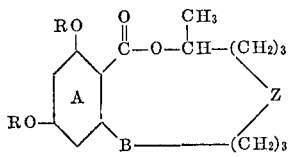

wherein B is selected from the group consisting of —CH₂—CH₂— and —CH=CH—; Z is selected from the group of consisting of >C=O, >CH₂, and >CHOR; R is selected from the group consisting of hydrogen, lower alkyl and lower saturated acyclic acyl and

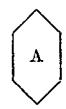

is selected from the group consisting of a benzene ring and a cyclohexane ring, with the proviso that when

is a cyclohexane ring, B is —CH₂—CH₂—, and Z is selected from the group consisting of >CH₂ and >CHOR.

3. The method of claim 2 wherein the compound has the structure:

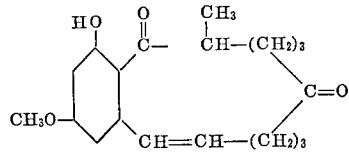

4. The method of claim 2 wherein the compound has the structure:

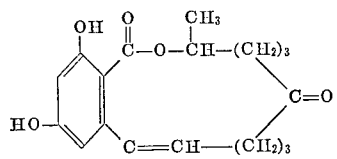

5. The method of claim 2 wherein the compound has the structure:

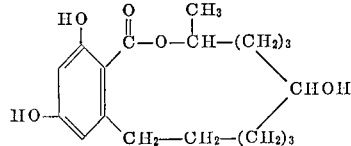

6. The method of claim 2 wherein the compound has the structure:

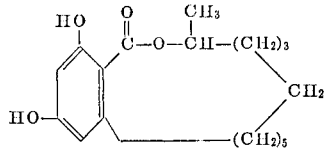

7. The method of claim 2 wherein the compound has the structure:

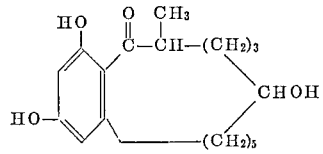

and a melting point between about 178 and 180° C.

8. The method of claim 2 wherein the compound has the structure:

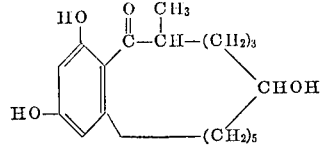

and a melting point between about 146 and 148° C.

9. The method of claim 2 wherein the compound has the structure:

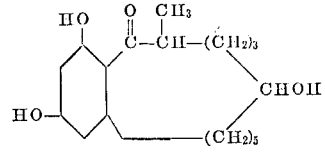

References Cited

UNITED STATES PATENTS

| | | | |
|---|---|---|---|
| 3,239,341 | 3/1966 | Hodge | 260—343.2 |
| 3,239,342 | 3/1966 | Hodge | 260—343.2 |
| 3,239,345 | 3/1966 | Hodge | 260—343.2 |
| 3,239,347 | 3/1966 | Hodge | 260—343.2 |
| 3,239,348 | 3/1966 | Hodge | 260—343.2 |
| 3,239,352 | 3/1966 | Hodge | 260—343.2 |
| 3,239,354 | 3/1966 | Hodge | 260—343.2 |
| 3,239,355 | 3/1966 | Hodge | 260—343.2 |
| 3,239,356 | 3/1966 | Hodge | 260—343.2 |

ALBERT T. MEYERS, *Primary Examiner.*

S. J. FRIEDMAN, *Assistant Examiner.*

U.S. Cl. X.R.

117—155; 161—216, 252

UNITED STATES PATENT OFFICE
CERTIFICATE OF CORRECTION

Patent No. 3,453,367    Dated July 1, 1969

Inventor(s) Marvin C. Bachman and Phil H. Hidy

It is certified that errors appear in the above-identified patent and that said Letters Patent are hereby corrected as shown below:

Column 2, lines 5 through 10, (A) should be (A) ;
Column 2, lines 17 through 22, (A) should be (A) ;
Column 3, line 66, "supra" should be --supra--;
Column 4, Example I, the structural formula should be

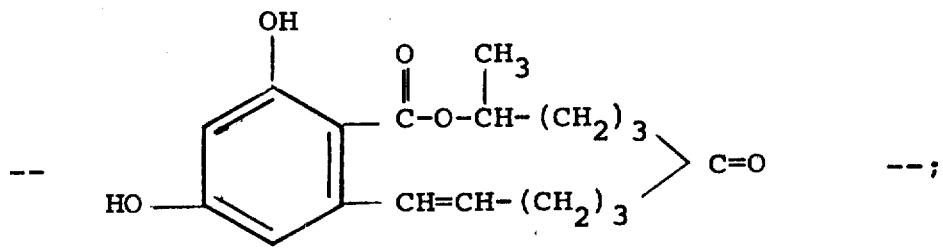

--;

Column 6, Example IX, the structural formula should be

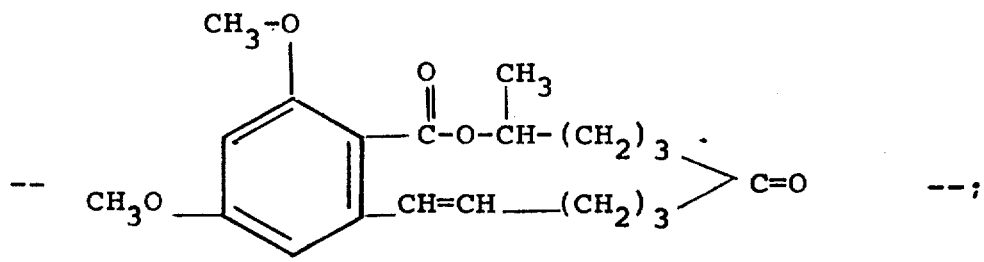

--;

PO-1050
(5/69)

UNITED STATES PATENT OFFICE
CERTIFICATE OF CORRECTION

Patent No. 3,453,367                             Dated July 1, 1969

Inventor(s)   Marvin C. Bachman and Phil H. Hidy

It is certified that error appears in the above-identified patent and that said Letters Patent are hereby corrected as shown below:

Page 2

Column 6, Example X, the structural formula should be

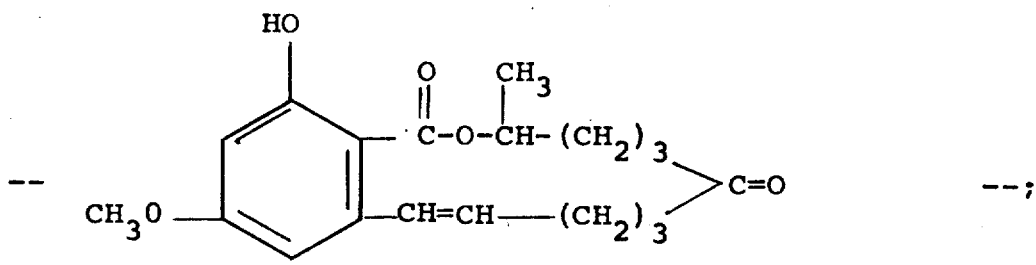    --;

Column 7, Example XI, the structural formula should be

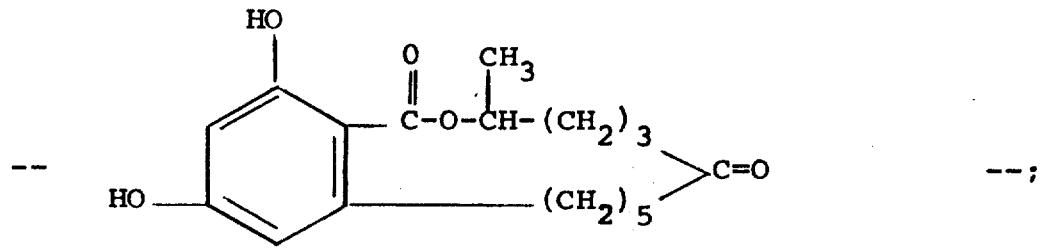    --;

Column 7, Example XII, the structural formula should be

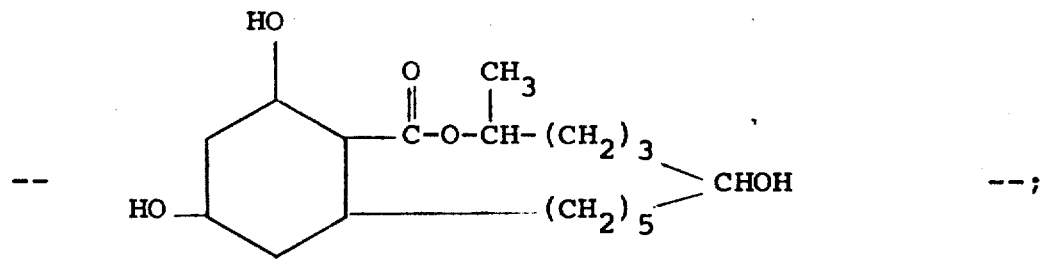    --;

PO-1050
(5/69)

UNITED STATES PATENT OFFICE
CERTIFICATE OF CORRECTION

Patent No. 3,453,367             Dated  July 1, 1969

Inventor(s)  Marvin C. Bachman and Phil H. Hidy

It is certified that error appears in the above-identified patent and that said Letters Patent are hereby corrected as shown below:

Page 3

Column 8, Table I, under "Final gm. (av.)" opposite "F.E.S., 160 mg./ml.", "49" should be --59--;
Column 9, Table III, under "Treatment", "Deoxyetraydro" should be --Deoxy Tetrahydro-- in each instance;
Column 9, Table IV, under "Thymus Weight, mg. (av.)" opposite "Controls, 1% COPE", "207" should be --204--;
Column 9, Table IV, under "Thymus Weight, mg. (av.)" opposite Asprin, 10 mg./ml.", "184" should be --187--;
Column 9, Table IV, under "Thymus Weight, mg. (av.)" opposite "2,4-dimethyl F.E.S., 40 mg./ml.", "174" should be --177--;
Column 9, Table IV, under "Thymus Weight, mg. (av.)" opposite 2,4-dimethyl F.E.S., 80 mg./ml.", "152" should be --150--;
Column 9, Table IV, under "Thymus Weight, mg. (av.)" opposite "4-methyl F.E.S., 10 mg./ml.", "180" should be --182--;
Column 9, Table IV, under "Thymus Weight, mg. (av.)" opposite "4-methyl F.E.S., 40 mg./ml.", "197" should be --194--;

Column 11, Claim 3, the structural formula should be

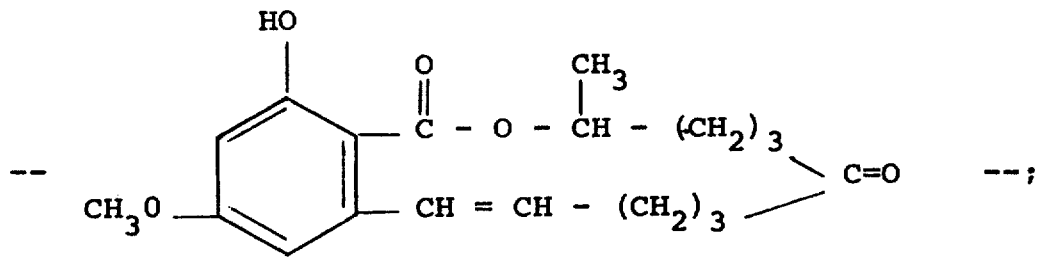

UNITED STATES PATENT OFFICE
CERTIFICATE OF CORRECTION

Patent No. 3,453,367  Dated July 1, 1969

Inventor(s) Marvin C. Bachman and Phil H. Hidy

It is certified that error appears in the above-identified patent and that said Letters Patent are hereby corrected as shown below:

Page 4

Column 12, Claim 7, the structural formula should be

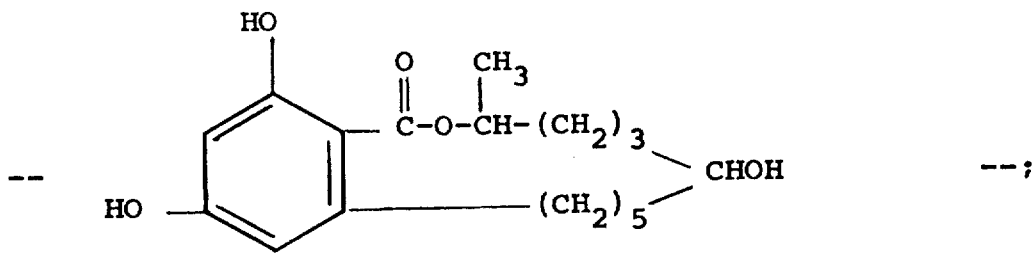

Column 12, Claim 8, the structural formula should be

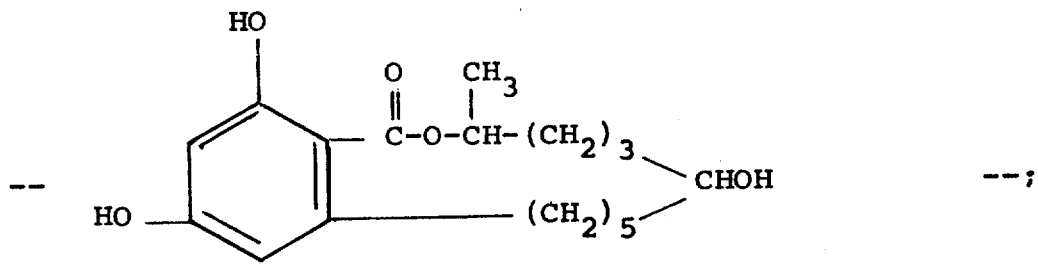

Column 12, Claim 9, the structural formula should be

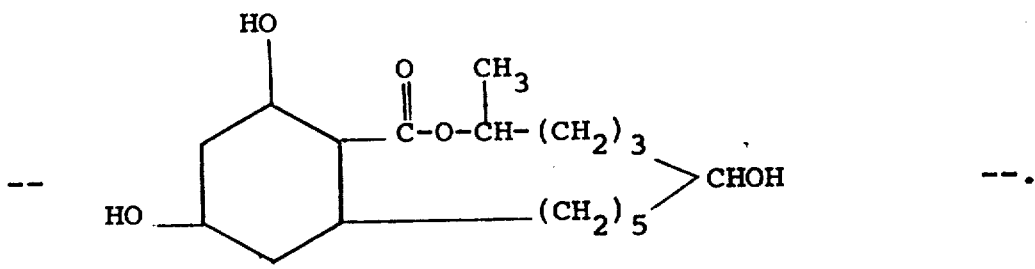

Signed and sealed this 26th day of October 1971.

(SEAL)
Attest:

EDWARD M. FLETCHER, JR.
Attesting Officer

ROBERT GOTTSCHALK
Acting Commissioner of Patents